United States Patent [19]

Long et al.

[11] Patent Number: 4,803,184

[45] Date of Patent: * Feb. 7, 1989

[54] CONVERSION OF CRUDE OIL FEEDS

[75] Inventors: Gary N. Long, Putnam Valley; Regis J. Pellet, Croton-On-Hudson; Jule A. Rabo, Armonk, all of N.Y.

[73] Assignee: UOP, DesPlains, Ill.

[*] Notice: The portion of the term of this patent subsequent to Dec. 13, 2005 has been disclaimed.

[21] Appl. No.: 675,285

[22] Filed: Nov. 27, 1984

Related U.S. Application Data

[63] Continuation-in-part of Ser. No. 490,952, May 2, 1983, Pat. No. 4,512,875.

[51] Int. Cl.$^4$ ............................................. B01J 27/18
[52] U.S. Cl. ........................................ 502/63; 208/120; 502/69; 502/214
[58] Field of Search .................... 502/63, 214, 69; 208/120 MC, 114

[56] References Cited

U.S. PATENT DOCUMENTS

| | | | |
|---|---|---|---|
| 2,270,044 | 1/1942 | Fulton et al. | 208/114 |
| 2,865,842 | 2/1958 | Hirschler et al. | 208/114 |
| 3,240,697 | 3/1966 | Miale et al. | 585/640 |
| 3,974,062 | 8/1976 | Owen et al. | 208/251 R |
| 4,002,557 | 1/1977 | Owen et al. | 208/251 R |
| 4,035,285 | 7/1977 | Owen et al. | 208/56 |
| 4,158,621 | 6/1979 | Swift et al. | 208/114 |
| 4,239,654 | 12/1980 | Gladrow et al. | 208/120 |
| 4,310,440 | 1/1982 | Wilson et al. | 208/114 |
| 4,327,236 | 4/1982 | Klotz | 585/481 |
| 4,340,465 | 7/1982 | Miller et al. | 208/120 |
| 4,359,595 | 11/1982 | Rollmann | 585/640 |
| 4,390,415 | 6/1983 | Myers | 208/113 |
| 4,405,445 | 9/1983 | Kovach et al. | 208/120 |
| 4,434,047 | 2/1984 | Hensley, Jr. et al. | 208/111 |
| 4,440,871 | 4/1984 | Lok et al. | 208/114 |
| 4,496,785 | 1/1985 | Miller et al. | 585/640 |
| 4,499,327 | 2/1985 | Kaiser | 585/640 |
| 4,512,875 | 4/1985 | Long et al. | 208/114 |
| 4,556,645 | 12/1985 | Coughlin et al. | 502/214 |
| 4,569,833 | 2/1986 | Gortsema et al. | 502/214 |
| 4,588,846 | 5/1986 | Mitsui et al. | 568/835 |
| 4,605,790 | 8/1986 | Wojtkowski | 568/750 |
| 4,666,875 | 5/1987 | Pellet et al. | 502/63 |
| 4,683,050 | 7/1987 | Ward | 208/110 |

OTHER PUBLICATIONS

Haggin, Joseph; C&EN Chicago "Aluminophosphates Broaden Shape Selective Shape Selective Catalyst Types". pp. 36,37.
Wilson et al., J. Chem. Soc. 1982, 104, 1146–1147.

Primary Examiner—John Doll
Assistant Examiner—Jeffrey Edwin Russel
Attorney, Agent, or Firm—Vincent J. Vasta, Jr.

[57] ABSTRACT

The process for conversion of crude oil feeds in the presence of a silicoaluminophosphate molecular sieve of U.S. Pat. No. 4,440,871 and/or an aluminophosphate molecular sieve of U.S. Pat. No. 4,310,440.

14 Claims, No Drawings

CONVERSION OF CRUDE OIL FEEDS

CROSS REFERENCE TO RELATED APPLICATION

This application is a continuation-in-part application of U.S. Ser. No. 490,952, filed May 2, 1983, now U.S. Pat. No. 4,512,875.

FIELD OF THE INVENTION

The instant process relates to a new process for the conversion of crude oils by catalytic cracking comprising contacting said crude oil with a catalyst comprising at least one non-zeolitic molecular sieve selected from the group consisting of silicoaluminophosphates and aluminophosphates.

BACKGROUND OF THE INVENTION

There is a continuing demand for refinery products, including gasoline, distillates (e.g., diesel and jet fuels) and gaseous fuels. Because of this ongoing need for petroleum products, petroleum refiners are often forced to work with heavier, often hydrogen deficient, and high impurity feeds or simply wish to maximize the saleable products from the raw materials. Also, there is a growing pressure to utilize every fraction of the crude oil including light refinery gases and resids, in the effort to optimize liquid fuel production.

U.S. Pat. No. 4,440,871 discloses a novel class of crystalline microporous silicoaluminophosphates. U.S. Pat. No. 4,310,440 discloses a novel class of crystalline aluminophosphates. These novel molecular sieves are disclosed as generally employable in catalytic cracking processes but no mention is made of employing such molecular sieves in conjunction with zeolite aliminosilicate cracking catalysts.

In copending U.S. Ser. No. 675,283 filed 11-27-84, filed concurrently herewith and commonly assigned, a catalytic cracking process is disclosed using mixed catalysts comprising zeolitic aluminosilicates and at least one molecular sieve, including the molecular sieves of U.S. Pat. No. 4,440,871 characterized by an adsorption of cyclohexane of at least 2 percent by weight at a pressure of 90 torr and a temperature of 24° C. Further, in copending U.S. Ser. No. 675,279 filed 11-29-84, filed concurrently herewith and commonly assigned, there is disclosed a process for the cracking of crude oil feedstock with a molecular sieve characterized by an adsorption of cyclohexane of at least 2 percent by weight at a pressure of 90 torr and a temperature of 24° C.

SUMMARY OF THE INVENTION

The instant process relates to a process for the catalytic cracking of a crude oil, e.g., crude oil, syncrudes, shale and tar sands and the like and generally comprises contacting the crude oil with a catalyst containing a zeolitic aluminosilicate and a non-zeolite molecular sieve (as hereinafter defined) at effective catalytic cracking conditions.

In one embodiment the invention relates to processing a crude oil to which at least one carbon-hydrogen fragmentation compound(s) has been added and contacting such mixture with a catalyst containing a non-zeolitic molecular sieve selected from the group consisting of silicoaluminophosphates and aluminophosphates. Optionally, the non-zeolitic molecular sieve may be mixed with a zeolitic cracking catalyst in this embodiment. The cracking operation may occur in the presence of a hydrogen activating function or other catalytic components.

DETAILED DESCRIPTION OF THE INVENTION

The present invention relates to the conversion of a crude oil feed to hydrocarbon products by use of a non-zeolitic molecular sieve catalyst wherein such crude oil feed is contacted with a catalyst comprising at least one molecular sieve selected from the group consisting of silicoaluminophosphates and aluminophosphates. In one embodiment a crude oil feed is contacted with a catalyst comprising a zeolitic aluminosilicate and at least one molecular sieve selected from the group consisting of silicoaluminophosphates and aluminophosphates. In a second embodiment a crude oil feed is mixed with at least one "carbon-hydrogen fragmentation compound" as hereinafter discussed, and contacted with a catalyst selected from the group consisting of silicoaluminophosphates and aluminophosphates and, optionally, a zeolitic aluminosilicate(s).

The term "crude oil feed" is used herein to denominate any full range crude oil from primary, secondary or tertiary recovery from conventional or offshore oil fields. The term "crude oil feed" may also include any full range "syncrude" such as those that can be derived from coal, shale oil, tar sands and bitumens. The crude may be virgin (straight run) or generated synthetically by blending. It is generally desirable, however, to first desalt the crude since sodium chloride is known to be a poison for most cracking operations. Further the term "crude oil feed" is meant to include component parts of the crude which are generally employed as catalytic cracking feeds or potential feeds therefore and include feeds such as distillate gas oils, VGO, heavy vacuum gas oils, atmospheric and vacuum resids, syncrudes (from shale oil, tar sands, coal), pulverized coal and fractions boiling above the traditional end of the gasoline boiling range which generally includes compounds containing greater than about eleven carbon atoms and combinations thereof.

When a "zeolitic aluminosilicate" is employed herein, such refers to zeolitic aluminosilicate cracking catalyst as traditionally employed heretofore in the conversion of various feedstocks to hydrocarbon products.

The zeolitic aluminosilicate component of the catalysts of this invention may be any zeolitic aluminosilicate heretofore employed as a component in cracking catalysts. Representative of the zeolites disclosed heretofore as employable in cracking catalysts are Zeolite Y, Zeolite X, Zeolite beta (U.S. Pat. No. 3,308,069), Zeolite KZ-20 (U.S. Pat. No. 3,445,727), Zeolite ZSM-3 (U.S. Pat. No. 3,415,736), Zeolite LZ-10, faujasite, other ZSM-type zeolites and mixtures thereof.

Representative Y-type zeolites believed employable herein include but are not limited to those disclosed in U.S. Pat. Nos.: 3,130,007; 3,835,032; 3,830,725; 3,293,192; 3,449,070; 3,839,539; 3,867,310; 3,929,620; 3,929,621; 3,933,983; 4,058,484; 4,085,069; 4,175,059; 4,192,778; 3,676,368; 3,595,611; 3,594,331; 3,536,521; 3,293,192; 3,966,643; 3,966,822 and 3,957,623.

Another zeolitic aluminosilicate employable herein is "LZ-210", as described in EPC Application No. 81110620,3, having EPC Publication No. 82.211 and published June 29, 1983 said application being incorporated herein by reference thereto and in U.S. Pat. No. 4,503,023.

The term "ZSM-type" zeolites is generally employed in the art to refer to those zeolites denominated by the nomenclature "ZSM-n" where "n" is an integer. The ZSM-type aluminosilicates include but are not limited to ZSM-5, ZSM-11, ZSM-12, ZSM-23, ZSM-35, ZSM-38, ZSM-48; and other similar materials.

ZSM-5 is described in greater detail in U.S. Pat. No. 3,702,886 and U.S. Pat. No. Re. 29,948. The entire descriptions contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference. ZSM-12 is described in U.S. Pat. No. 3,832,449. That description, and in particular the X-ray diffraction pattern disclosed therein, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern hereof, is incorporated herein by reference.

When such a zeolitic component is employed herein, it is generally intimately dispersed in a matrix with the non-zeolitic molecular sieve.

The catalyst may contain additional "hydrogen-activating function", i.e., may aid in the redistribution of carbon-hydrogen fragments or may also aid in the transfer of hydrogen, hydrogen dissociation and/or hydrogen activation. The non-zeolitic component may have one or more metal functions if the process is carried out without significant amounts of hydrogen being present.

The term "hydrogen transfer" is generally employed herein consistent with its common meaning to characterize the ability to transfer hydrogen from one type of hydrocarbon to another with a catalyst particularly promoting the transfer. This type of chemical reaction is to be contrasted with hydrogenation catalysts or catalyst components capable of attaching hydrogen to an olefin from gaseous molecular hydrogen.

The silicoaluminophosphates and aluminophosphates employed in the processes of the instant invention are disclosed, respectively, in U.S. Pat. No. 4,440,871 and U.S. Pat. No. 4,310,440, said patents being incorporated herein by reference thereto.

The silicoaluminophosphate molecular sieves of U.S. Pat. No. 4,440,871 (denominated therein as "SAPO-n" where "n" is an integer) are disclosed as microporous crystalline silicoaluminophosphates the pores of which are uniform and have nominal diameters of greater than about 3 Angstroms and whose essential empirical chemical composition in the as-synthesized and anhydrous form is $$mR:(Si_xAl_yP_z)O_2$$

wherein "R" represents at least one organic templating agent present in the intracrystalline pore system; "m" has a value of from 0.02 to 0.3; "m" represents the moles of "R" present per mole of $(Si_xAl_yP_z)O_2$; "x", "y" and "z" represent the mole fractions of silicon, aluminum and phosphorus respectively, present as tetrahedral oxides, said mole fractions being such that they are within the pentagonal compositional area defined by points A, B, C, D and E of the ternary diagram which is FIG. 1 of the drawings of U.S. Pat. No. 4,440,871. Further, such may be calcined at a temperature sufficiently high to remove at least some of the organic templating agent present in the intracrystalline pore system. Further, the silicoaluminophosphate molecular sieves of U.S. Pat. No. 4,440,871 may be characterized as silicoaluminosphate material having a three-dimensional microporous framework structure of $PO_2^+$, $AlO_2^-$ and $SiO_2$ tetrahedral units, and whose essential empirical chemical composition on an anhydrous basis is:

$$mR:(Si_xAl_yP_z)O_2$$

wherein "R" represents at least one organic templating agent present in the intracrystalline pore system; "m" represents the mole of "R" present per mole of $(Si_xAl_yP_z)O_2$; "x", "y" and "z" represent, respectively, the mole fractions of silicon, aluminum and phosphorus present in the oxide moiety, said mole fractions being within the compositional area bounded by points A, B, C, D and E on the ternary diagram which is FIG. 1 of U.S. Pat. No. 4,440,871, said silicoaluminophosphate having a characteristic X-ray powder diffraction pattern which contains at least the d-spacings set forth in any one of Tables I, III, V, VII, IX, XII, XVII, XXI, XXIII or XXV of U.S. Pat. No. 4,440,871.

The aluminophosphate molecular sieves of U.S. Pat. No. 4,310,440 (denominated therein as "AlPO$_4$-n" where "n" is an integer) are generally described as being crystalline aluminophosphates having a framework structure whose chemical composition expressed in terms of mole ratios of oxides is $$Al_2O_3: 1.0\pm0.2\ P_2O_5$$

each of said framework structures being microporous in which the pores are uniform and have nominal diameters within the range of about 3 to about 10 Angstroms, an intracrystalline adsorption capacity for water at 4.6 torr and 24° C. of at least 3.5 weight percent, the adsorption and desorption of water being completely reversible while retaining the same essential framework topology in both the hydrated and dehydrated state.

As above noted, members of the classes of SAPO's and AlPO$_4$s are characterized simply by referring to such members as SAPO-5, SAPO-11, AlPO$_4$-5, AlPO$_4$-11, etc, i.e., a particular species will be referred to as "SAPO-n" or "AlPO$_4$-n" where "n" is a number specific to a given class member as its preparation is reported in U.S. Pat. Nos. 4,440,871 and 4,310,440. This designation is an arbitrary one and is not intended to denote structure or relationship between a SAPO or AlPO$_4$ or to another material(s) which may also be characterized by a numbering system.

In carrying out the instant process the non-zeolitic component may be admixed (blended) with other materials which may provide some property which is beneficial under process conditions, such as improved temperature resistance or improved catalyst life by minimization of coking or which is simply inert under process conditions. Such materials may include synthetic or naturally occurring substances as well as inorganic material such as clays, silicas, aluminas, metal oxides and mixtures thereof. In addition, materials such as silicasols, aluminoasols, silica-alumina, silica-magnesia, silica-zirconia, silica-thoria, silica-berylia, silica-titania, as well as ternary compositions, such as silica-alumina-thoria, silica-alumina-zirconia and clays may be employed. The relative proportions of the above materials and the non-zeolitic content may vary widely between about 1 and about 99 percent by weight of the final catalyst composite.

The silicoaluminophosphates, aluminophosphates and, the zeolitic aluminosilicate component(s) may be modified in activity by mixing with a matrix material having significant or only slight or no catalytic activity. It may be one providing a beneficial effect as observed in large molecule cracking with a large pore material which may act as a coke sink. Catalyticallly active inorganic oxide matrix materials are particularly desired because of their porosity, attrition resistance and stability under the cracking reaction conditions generally encountered in a fluid catalyst cracking operation. Inorganic oxide gels suitable for this purpose are fully disclosed in U.S. Pat. No. 3,140,253 issued July 7, 1964 and such disclosure is incorporated herein by reference.

The catalyst may also be provided with an effective amount of a hydrogenation metal if the process is carried out without significant amounts of hydrogen being present.

In one embodiment a crude oil feed is contacted with a catalyst at effective cracking conditions wherein the catalyst comprises at least one zeolitic aluminosilicate as generally employed in cracking catalysts and at least one molecular sieve selected from the group of silicoaluminophosphates of U.S. Pat. No. 4,440,871 and aluminophosphates of U.S. Pat. No. 4,310,440.

In a second embodiment of the present invention carbon-hydrogen fragments are provided in a hydrocarbon conversion operation by use of a non-zeolitic molecular sieve which acts as an activation catalyst for carbon-hydrogen fragmentation compounds whereby such carbon-hydrogen fragments are provided in such amounts that the yield of desired hydrocarbon product will be simultaneously increase. In this second embodiment a hydrocarbon conversion process is provided by use of a catalyst comprising at least one silicoaluminophosphate and aluminophosphate molecular sieve and, may optionally, also contain a zeolitic aluminosilicate as a cracking component, wherein said catalyst will promote chemical reactions with the carbon-hydrogen fragementation compounds, and by such process promote the catalytic cracking process to provide useful products by contributing such carbon-hydrogen fragments, e.g. $CH_x$ (X is 1, 2 or 3), to the hydrocarbon fuel products boiling in a lower range than the crude oil feed.

In this second embodiment the invention employs a carbon-hydrogen fragmentation compound and a crude oil feed which are intimately mixed with one another and reacted with the catalyst as above described. The process provides carbon-hydrogen fragment for addition reactions, e.g. methylation, which can occur to produce desired products. The carbon-hydrogen fragment addition reactions occur in the presence of the catalyst at effective process conditions.

A particular advantage of this second embodiment is that it can be carried out at low pressures (i.e. at pressures commonly employed in current catalytic cracking operations or slightly higher.) It is most preferred that the reactions be performed in fluidized catalyst systems (risers, dense beds, etc.), but they can also be practiced in some fixed catalyst bed arrangements or moving bed catalytic systems. The reactions described herein may occur in one stage of operation all at the same process conditions, or in a sequence of two or more stages of operation, at the same or different processing conditions. Further, the catalyst functions referred to herein may be on the same catalyst particle, or on different catalyst particles such as on the zeolitic aluminosilicate, silicoaluminophosphate, aluminophosphate, or mixtures thereof.

Specific advantages of this second embodiment include the conversion of heavy crude feedstocks to lower boiling hydrocarbon fuels with improved gasoline yeild and/or gasoline quality (including octane and volatility) with a high yield of hight fuel oil fractions. The need for costly high pressure hydrocrackers using expensive molecular hydrogen rich gas can be eliminated, and/or the severity of the operation greatly decreased, thus saving condiserable capital investment and operating costs.

The term "carbon-hydrogen fragmentation compound(s)" is employed herein to mean materials comprising a lesser number of carbon atoms than found in materials within the gasoline boiling range, preferably those materials containing 4 or less carbon atoms, that fit into any of the categories of:

(a) A molecule whose chemical structure permits or favors the transfer of carbon-hydrogen fragments. This includes $CH_3OH$, other low boiling alcohols such as ethanol, n-propanol, isopropanol, n-butanol, isobutanol, etc., aliphatic ethers, e.g., dimethyl ether, and other oxygen compounds (acetals, aldehydes, ketones).

(b) Hydrogen-rich molecules, i.e. molecules with wt. % hydrogen ranging from about 13.0–25.0 wt. %. This may include light paraffins, i.e. $CH_4$, $C_2H_6$, $C_3H_8$ and other materials.

(c) Secondary Reaction Products from materials in categories (a) or (b) above that are carbon-hydrogen fragmentation compounds themselves, or transfer hydrogen. This includes olefins, naphthenes, or paraffins.

(d) Classes of materials which are structurally or chemically equivalent to those of category (c), notably olefins, etc.; and (e) A combination of any or all of the materials in categories (a) through (d) in an effective amount wherein each material may be present in an amount between about 1% and about 99% by weight based on the total weight of the combined materials of categories (a) through (d) can provide the carbon-hydrogen fragmentation compounds employed in the instant process.

The carbon-hydrogen fragmentation compound is generally employed in an amount between about 1 and about 25 percent by weight and preferably between about 5 and about 20 percent by weight based on the total feed weight, although amounts in excess of 25 percent by weight may be employed depending on the crude oil feed, selective non-zeolitic molecular sieve and the effective process conditions.

The preferred carbon-hydrogen fragmentation compounds are methanol, dimethyl ether and $C_2$–$C_5$ olefins, with methanol and dimethyl ether and mixtures thereof being the most preferred.

One particularly surprising aspect of this second embodiment is the ability of the silicoaluminophosphate and/or aluminophoshate composition(s) to generate carbon-hydrogen fragmentation compounds in situ from the initial carbon-hydrogen fragmentation compound, e.g., methanol, and, further, the relative selectivity of such component(s) for conversion of the carbon-hydrogen fragmentation compound over the crude oil feed.

The "carbon-hydrogen fragmentation compounds" may be provided to the process in most any way so long as it is present when contact with the catalyst material is effected, i.e. in situ generation is suitable.

Current practice for upgrading high molecular weight, hydrogen-deficient, high-impurity refinery stocks generally involves either hydrotreating followed by catalytic cracking, or hydrocracking, both of which involve the use of costly gaseous hydrogen at high pressures (i.e. 500-3000 psig), in expensive, high-pressure process units. Alternately some poor quality stocks are catalytically cracked alone with low quality product being produced which requires extensive upgrading or dilution before becoming saleable. Some of these processes often require expensive gas compressors and complex heat transfer or hydrogen-quenching systems. In addition, although those processes improve conversion and product yields, significant losses in gasoline octane are often incurred, requiring a subsequent reforming step to upgrade gasoline quality.

This second embodiment preferably employs a fluidized catalyst system at low pressures. Preferably, the process does not employ added hydrogen gas and is generally substantially free of added hydrogen. Such a system promotes the highly efficient contact of relatively inexpensive carbon-hydrogen fragmentation compounds with heavy, refractory molecules in the presence of high-surface area cracking catalyst. Intermolecular hydrogen-transfer interactions, e.g., methylating reactions, and catalytic cracking reactions are effected in the presence of fluidized catalyst particles and act to minimize problems due to diffusion/mass transport limitations and/or heat transfer.

This second embodiment can make use of the relatively cheap carbon-hydrogen fragmentation compounds readily available in petroleum refineries, such as light gas fractions, light olefins, low boiling liquid streams, etc. It also makes particular use of methanol, a product which is readily available in quantity, either as a transportable product from overseas natural gas conversion processes, or as a product from large scale coal, shale, or tar sand gasification. It also can utilize carbon monoxide (in combination with contributors such as water or methanol), which gas is readily available from refinery regeneration flue gas (or other incomplete combustion processes), or from coal, shale, or tar sand gasification. Highly efficient recycle of carbon-hydrogen fragmentation compounds can also be effected.

A particularly attractive feature of this second embodiment is concerned with converting a mixed molecular weight crude as the charge with the light end portion thereof constituting at least a part of the carbon-hydrogen fragmentation compound alone or in combination with added methanol or other carbon-hydrogen fragmentation compounds.

The combination reactions comprising this invention are believed to be effective, at least in part, in removing sulfur, oxygen, nitrogen and metal contaminants found in a whole crude or a heavy hydrocarbon portion thereof.

In the preferred operation of this second embodiment methanol and/or dimethyl ether is used in combination with a gas oil type of hydrocarbon charge stock. The weight percent of methanol in the hydrocarbon charge passed to the crude oil conversion operation will vary considerably and may be selected from within the range of between about 1% and about 25 percent by weight, it being preferred to maintain the ratio within the range between about 5% and about 20, based on the weight of the feed. However, this may vary depending upon the carbon-hydrogen fragment and/or hydrogen deficiency of the crude oil feed, the amount of sulfur, nitrogen and oxygen in the crude oil feed, the amount of polycyclic aromatics, the type of catalyst employed, and the level of conversion desired.

The operation of the various embodiments of this invention are generally carried out at effective conversion temperatures within the range of 400° F. to about 1400° F. and more usually within the range of 700° F. to about 1200° F. at effective conversion pressures selected from within the range of below atmospheric up to several hundred pounds but normally less than 100 psig. The selection of effective catalytic cracking conditions are well known in the patent and other literature. Preferred conditions include a temperature within the range of about 800° F. to about 1150° F. and pressures within the range of atmospheric to about 200 psig and higher.

The following examples are provided to illustrate the invention are not intended to be limiting thereof:

EXAMPLES 1-5

The use of a catalyst comprising one of the following molecular sieves is evaluated in the instant process:

| Example | |
|---|---|
| 1 | SAPO-5 |
| 2 | SAPO-34 |
| 3 | SAPO-11 |
| 4 | SAPO-31 |
| 5 | AlPO$_4$-5 |

The crude oil feed is a heavy vacuum gas oil and is employed in a cracking operation. The vacuum gas oil is characterized by the API gravity (60° F.) of 20.5, an average molecular weight of about 400 and a boiling range between about 700° F. and about 940° F. The carbon-hydrogen fragmentation compound is methanol and is present in an amount of 14 percent by weight. Each catalyst is tested in a riser FCC unit after heating the catalyst to about 1000° F. The products show improved selectivity to motor fuel (hydrocarbon) products by addition of the carbon-hydrogen fragments from methanol as characterized by the presence of hydrocarbon fuels boiling below the boiling range of the crude oil feed.

EXAMPLES 8-10

Examples 1 to 5 are repeated except that the carbon-hydrogen fragmentation compound is dimethyl ether. Results similar to those observed for methanol are observed.

EXAMPLES 10-15

Examples 1 to 5 are repeated except that zeolite Y is admixed with the non-zeolitic molecular sieve in an equal weight. Results similar to those of examples 1 to 6 are observed with catalytic cracking reactions being observed also.

What is claimed is:

1. A catalyst effective in cracking of crude oil feeds, comprising a zeolitic aluminosilicate cracking catalyst effective in cracking of crude oil feeds selected from the group consisting of zeolite Y, LZ-210, LZ-10, Faujasite and mixtures thereof and at least one molecular sieve selected from the group consisting of the silicoaluminophosphates SAPO-5 and SAPO-11 of U.S. Pat. No. 4,440,871.

2. A catalyst according to claim 1 wherein said catalyst comprises a Y zeolite.

3. A catalyst according to claim 1 wherein at least one of said zeolitic aluminosilicate and said at least one molecular sieve is admixed with an inorganic oxide matrix material.

4. A catalyst according to claim 1 further comprising at least one molecular sieve selected from the group of aluminophosphates of U.S. Pat. No. 4,310,440.

5. A catalyst effective in cracking of crude oil feeds, comprising at least one zeolitic aluminosilicate cracking catalyst effective in cracking of crude oil feeds and selected from the group of zeolites consisting of, LZ-10, LZ-210 and mixtures thereof and at least one molecular sieve selected from the group consisting of the silicoaluminophosphates SAPO-5 and SAPO-11 of U.S. Pat. No. 4,440,871.

6. A catalyst according to claim 5 wherein said zeolitic aluminosilicate comprises LZ-210.

7. A catalyst according to claim 5 further comprising at least one molecular sieve selected from the group consisting of aluminophosphates of U.S. Pat. No. 4,310,440.

8. A catalyst according to claim 5 wherein said zeolite aluminosilicate comprises LZ-10.

9. A catalyst according to claim 5 wherein at least one of said zeolitic aluminosilicate and said at least one molecular sieve is admixed with an inorganic oxide matrix material.

10. A catalyst comprising:
    (1) a zeolitic aluminosilicate cracking catalyst effective in cracking of crude oil feeds and comprising LZ-210; and
    (2) at least one molecular sieve selected from the group consisting of the silicoaluminophosphates SAPO-5 and SAPO-11 of U.S. Pat. No. 4,440,871.

11. A catalyst according to claim 10 further comprising at least one molecular sieve selected from the group consisting of aluminophosphates of U.S. Pat. No. 4,310,440.

12. A catalyst effective in cracking of crude oil feeds, comprising a zeolitic aluminosilicate cracking catalyst effective in cracking of crude oil feeds comprising LZ-10 zeolite and at least one molecular sieve comprising the silicoaluminosilicate SAPO-11 of U.S. Pat. No. 4,440,871.

13. A catalyst according to claim 12 further comprising at least one molecular sieve selected from the group consisting of aluminophosphates of U.S. Pat. No. 4,310,440.

14. A catalyst according to claim 12 wherein at least one of said zeolitic aluminosilicate and said at least one molecular sieve is admixed with an inorganic oxide matrix material.

* * * * *